US008521639B2

(12) United States Patent
Jones et al.

(10) Patent No.: US 8,521,639 B2
(45) Date of Patent: Aug. 27, 2013

(54) METHOD AND APPARATUS FOR CONDUCTING A TRANSACTION

(75) Inventors: Emerson P. Jones, Greenwich, CT (US); Karen Schoen, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 12/779,689

(22) Filed: May 13, 2010

(65) Prior Publication Data

US 2011/0004541 A1 Jan. 6, 2011

Related U.S. Application Data

(63) Continuation of application No. 10/766,315, filed on Jan. 27, 2004, now Pat. No. 7,747,488.

(60) Provisional application No. 60/492,558, filed on Aug. 5, 2003, provisional application No. 60/493,187, filed on Aug. 7, 2003.

(51) Int. Cl.
*G06Q 40/00* (2012.01)

(52) U.S. Cl.
USPC .............................. 705/37; 705/36 R; 705/35

(58) Field of Classification Search
USPC ........................................................ 705/35, 37
See application file for complete search history.

(56) References Cited

U.S. PATENT DOCUMENTS

| 5,758,097 | A | 5/1998 | Debe et al. |
|---|---|---|---|
| 5,946,667 | A | 8/1999 | Tull et al. |
| 6,263,321 | B1 | 7/2001 | Daughtery, III |
| 6,381,585 | B1 | 4/2002 | Maples et al. |
| 2001/0056392 | A1 | 12/2001 | Daughtery, III |
| 2003/0093375 | A1 | 5/2003 | Green et al. |
| 2003/0130941 | A1 | 7/2003 | Birle et al. |
| 2003/0135436 | A1 | 7/2003 | Birle et al. |
| 2003/0135446 | A1 | 7/2003 | Birle et al. |
| 2003/0225656 | A1 | 12/2003 | Aberman et al. |
| 2004/0006520 | A1 | 1/2004 | Birle et al. |

OTHER PUBLICATIONS

"Information to Evaluate an Adjustable Rate mortgage" by mtgprofessor 2003.*
"Internal Revenue Service Issues Guidance on Popular Equity-Linked Financial Products" by Shearman & Sterling LLP 20003.*
"Internal Revenue Service Issues Guidance on Popular Equity-Linked Financial Products" by Shearman & Sterling LLP, 2003, http://shearman.jp/files/Publication/fa63fc75-ccb5-4563-b9ec-5c1496b 18142/Presentation/PublicationAttachment/cb609159-1568-4749-81c2-73a90da85f88/TAX_0703.pdf.
"Finance: New Basel Guidelines May Reduce Bank Corporate Governance" by sunsonline, 1998, http://www.sunsonline.org/trade/process/followup/1998/10290198.htm.
"Information to Evaluate an Adjustable Rate Mortgage" by mtgprofeessor.com/A%20-%20ARMs/information_needed_to_evaluate_an_arm.htm.

(Continued)

*Primary Examiner* — James A Vezeris
(74) *Attorney, Agent, or Firm* — Perkins Coie LLP

(57) ABSTRACT

Systems, methods, apparatus, computer program code and means for conducting a transaction are provided. In some embodiments, a unit is issued to a holder including a forward contract and a note, in which the note specifies an initial capped remarketing, at least a first subsequent capped remarketing, and an uncapped remarketing, the uncapped remarketing performed only if each of the capped remarketings fail.

16 Claims, 4 Drawing Sheets

(56) References Cited

OTHER PUBLICATIONS

ABN-AMRO HYPA, ". . . An equity-linked financial product available to Australian inventors," 4 pgs.
Capkun, Vedran and Kraft, Pepa, Master Thesis, "An Exploration of Exchangeable Bonds in Europe," University of Lausanne/HEC, Master of Science in Banking and Finance, 49 pgs.
Shin, Soonkyu, "A Note on Mandatory Convertible Securities," May 13, 2003, Brown Brothers Harriman, Insurance Asset Management, 5 pgs.
Nyborg, Kjell G., "Convertible Debt as Delayed Equity: Forced versus Voluntary Conversion and the Information Role of Call Policy," Journal of Financial Intermediation 4, (1995) London Business School, London NWI 4SA, UK, ISSN: 1042-9573, pp. 358-395.
Star, Marlene Givant, "Racy Models Enter Convertibles Market," Pensions & Investments, 23 (21), Oct. 16, 1995, ISSN: 1050-4974, Crain Communications Inc., 3 pgs.
Chidambaran, N.K., Fernando, Chitru S., and Spindt, Paul A., "Credit Enhancement Through Targeted Risk Management: Freeport-McMoRan's Gold-Denominated Depositary Shares," Oct. 1998, 36 pgs.
Hawthorne, Bruce N., Graham, John L., and Schubert, Elizabeth M., "Equity Derivatives," King & Spalding, Sep. 2001, 16 pgs.
"FIN-622 Financial Engineering from a Corporate Perspective—A Primer on Debt Securities with Embedded Options: The Case of Warrants and Convertibles," 9 pgs.
Gentry, William M. and Schizer, David M., "Fractions and Tax-Motivated Hedging: An Empirical Exploration of Publicly-Traded Exchangeable Securities," Sep. 2002, 54 pgs.
Doherty, Neil A., & Harrington, Scott E., "Investment Incentives, Bankruptcies and Reverse Convertible Debt," Mar. 1995, Wharton School, University of Pennsylvania, 35 pgs.
Craig M. Lewis, Richard J. Rogalski, and James K. Seward, "Is Convertible Debt a Substitute for Straight Debt or for Common Equity?" Aug. 1999, 43 pgs.
Metcalfe, Steve, Article—"The Mandatory Misconception," Euroweek, Apr. 25, 2003, Issue 800, p. 23, 1p, 5 pgs.
Doherty, Neil A., "Creating Value Through Managing Corporate Risk: Insurance, Financial Products and Financial Strategies," 22 pgs.
Flannery, Mark J., "No Pain, No Gain? Effecting Market Discipline via "Reverse Convertible Debentures,"" Nov. 2002, Graduate School of Business Administration, University of Florida, 32 pgs.
Sherwood, Robert J. and Walter, .S. Lee, "A Review and Comparison of Investment Methods for New Business Ventures," A White Paper, © 2002 Berberick Sherwood & Associates, 26 pgs.
Boczar, Thomas J., Esq., "Conceptualizing & Implementing a Stock Concentration Risk Management Program," [online] Twenty-First Securities Corporation, Trusts & Investments, Nov./Dec. 1998, [retrieved on Feb. 4, 2004]. 7 pgs.
"Lecture 10: Structured Notes and Hybrid Securities," Structured Finance & ART (Culp), Bus351152-81, Autumn 2003, 26 pgs.
Brennan, Michael J. and Schwartz, Eduardo S., "The Case for Convertibles," Journal of Applied Corporate Finance, University of California, pp. 55-64.
McConnell, John J. and Schwartz, Eduardo S., "The Origin of LYONs: A Case Study in Financial Innovation," Continental Bank, Journal of Applied Corporate Finance, p. 40-47.
Kang, Jun-Koo, Lee, Yul W., "The Pricing of Convertible Debt Offerings," Journal of Financial Economics, 41 (1996), SSDI:0304-405X, © 1996 Elsevier Science S.A., pp. 231-248.
"Why Issue Mandatory Convertibles? Theory and Empirical Evidence," Feb. 2003, 59 pgs.
Nelken, Lizzy, Handbook of Hybrid Instruments: "Convertible Bonds, Preferred Shares, Lyons, ELKS, DECS and other Mandatory Convertible Notes," John Wiley & Sons, Ltd., 2000, 80 pgs.
Chen, Andrew H.Y., Chen, K.C. and Howell, Scott, "An Analysis of Dividend Enhanced Convertible Stocks," International Review of Economics and Finance, vol. 8, 1999, pp. 327-338.
Das, Satyajit, "Structured Products & Hybrid Securities," John Wiley & Sons (Asia) Pte Ltd., 2001, pp. 401-508.
Arzac, R. Enrique, "PERCS, DECS, and Other Mandatory Convertibles," Bank of America, Journal of Applied Corporate Finance, vol. 10, 1, 1997, pp. 54-63.
"Internal Revenue Service Issues Guidance on Popular Equity-Linked Financial Products" by Shearman & Sterling LLP Jul. 2003.

\* cited by examiner

METHOD AND APPARATUS FOR CONDUCTING A TRANSACTION

CROSS REFERENCE TO RELATED APPLICATIONS

This application is a continuation of prior U.S. patent application Ser. No. 10/766,315, filed Jan. 27, 2004 now U.S. Pat. No. 7,747,488, entitled, "METHOD AND APPARATUS FOR CONDUCTING A TRANSACTION," which in turn claims priority to, and hereby incorporates by reference for all purposes, U.S. Provisional Application Ser. Nos. 60/492,558 and 60/493,187, filed Aug. 5, 2003 and Aug. 7, 2003 respectively. This application is related to co-pending and commonly assigned U.S. patent application Ser. No. 10/707,491, filed Dec. 17, 2003, the contents of which is incorporated herein by reference for all purposes.

BACKGROUND

The present invention relates to methods and apparatus for conducting transactions. More particularly, embodiments of the present invention relate to methods and apparatus for conducting transactions involving mandatory units.

Mandatory units are hybrid financial products involving the issuance of a stock purchase contract together with a debt instrument. These products were first introduced in the mid to late-1990's, and have become popular products providing benefits to both issuers and investors. Mandatory units provide a number of benefits to both the company issuing the unit as well as investors in the mandatory units. They may be used by issuers to implement more efficient financings that have desirable financial benefits that may not be achieved by straight debt or equity issuances.

Examples of hybrid products that provide desirable financial benefits to both issuers and investors include the hybrid described in our co-pending, commonly assigned, U.S. patent application Ser. No. 10/707,491, as well as the "ACES" mandatory units offered by the assignee of the present invention. A wide variety of other mandatory units are provided by other entities.

Many of these hybrids provide desirable financial benefits, including desirable tax treatment, when appropriately structured. In the U.S., for example, the Internal Revenue Service ("IRS") has confirmed in its Revenue Ruling 2003-97 that the interest on the debt portion of a mandatory unit is deductible if the purchase contract portion of the unit terminates in bankruptcy and if, on the issue date of the unit, it is substantially certain that a remarketing of the debt portion will succeed (it is not substantially certain if the reset rate is capped). That is, an issuer will enjoy interest deductions if the unit is structured such that the reset rate is not capped.

Unfortunately, this is at odds with regulatory requirements imposed on certain types of entities, limiting their ability to issue mandatory units. For example, in many countries, certain types of financial institutions must comply with rules and regulations imposing capital adequacy standards. In the U.S., for example, most financial institutions must comply with the Bank Holding Company Act of 1956 (12 U.S.C. §1841 et seq.). The capital adequacy standards required by the Bank Holding Company Act are generally implemented by rules promulgated (or enforced) by the U.S. Federal Reserve which has adopted risk-based capital measures used to assess the capital adequacy of regulated banking organizations. Similar risk-based capital measures are used in other countries.

These capital measures generally group capital into several categories: (1) "Tier 1" or "core" capital; and (2) "Tier 2" or "supplementary" capital. The capital measures generally require that the Tier 1 component of an institution's qualifying capital represent at least 50% of the institution's total capital, and generally includes freely available equity of the institution such as common stockholder equity, preferred stock and interests in the equity accounts of consolidated subsidiaries.

The capital measures generally require that the Tier 2 component may represent up to 100% of the Tier 1 component, and may include a number of different types of capital, such as allowances for loan and lease losses, perpetual preferred stock and related surplus, hybrid capital instruments, perpetual debt, and mandatory convertible debt securities. That is, hybrid instruments such as mandatory convertible debt securities, are considered Tier 2 capital. Regulated institutions also may need to comply with certain adequacy ratios that specify the relative amounts of Tier 1 and Tier 2 capital the institution can maintain at any given time. In general, regulated institutions prefer to increase the amount of Tier 1 capital. One reason that mandatory units are considered Tier 2 capital is that they typically have uncapped reset rates (pursuant to the IRS rules discussed above).

SUMMARY

To alleviate the problems inherent in the prior art, embodiments of the present invention provide systems, methods, apparatus, computer program code and means for issuing a unit to a holder include creating a forward contract, the forward contract specifying a settlement amount and a settlement date; creating a note securing obligations of the holder under the forward contract, the note specifying an initial capped remarketing, at least a first subsequent capped remarketing, and an uncapped remarketing, the uncapped remarketing performed only if each of the capped remarketings each of the capped and uncapped remarketings scheduled to occur prior to the settlement date; and issuing the forward contract and the note as a unit.

Some embodiments provide a system, method, apparatus, computer program code and means for remarketing a mandatory unit which include attempting an initial capped remarketing of a note portion of the mandatory unit, the initial remarketing attempted prior to a settlement date of a forward contract portion of the mandatory unit, the initial remarketing subject to a reset rate cap; attempting a subsequent capped remarketing if the initial remarketing is unsuccessful; and attempting, if both the initial capped remarketing and the subsequent capped remarketings are unsuccessful, a final remarketing of the note portion of the mandatory unit, the final remarketing attempted prior to the settlement date and not subject to a reset rate cap.

Pursuant to some embodiments, an opportunistic remarketing is attempted during an opportunistic remarketing period. The opportunistic remarketing is at the issuer's option and may be capped or uncapped. In some embodiments, the forward contract portion is settled with proceeds from a successful remarketing. In some embodiments, a remarketing is successful if the note can be resold for an amount greater than a settlement price associated with the forward contract.

With these and other advantages and features of the invention that will become hereinafter apparent, the nature of the invention may be more clearly understood by reference to the following detailed description of the invention, the appended claims and to the several drawings attached herein.

DETAILED DESCRIPTION

According to some embodiments, systems, methods, apparatus, computer program code, and means are provided for conducting a transaction. More particularly, some embodiments relate to transactions in mandatory units such that the transaction qualifies for treatment as Tier 1 capital. In this manner, regulated institutions may enjoy the benefits of issuing mandatory units. As used herein, the terms "Tier 1 issuer" or "regulated issuer" are generally used to refer to entities (typically financial institutions) that are subject to capital adequacy rules or regulations in one or more jurisdictions. For example, in the U.S., many financial institutions are regulated under the Bank Holding Company Act that imposes capital adequacy rules intended to strengthen the soundness and stability of the international banking system. As used herein, a "Tier 1 issuer" or "regulated issuer" is a financial institution regulated in the U.S. or in other jurisdictions. In particular, a "Tier 1 issuer" or "regulated issuer" is a Financial institution subject to regulatory capital requirements relating to the amount of Tier 1 and Tier 2 capital the issuer may maintain.

For convenience, as used herein, the term "note" as used in conjunction with embodiments described herein, is used to refer to a variety of different instruments, including, for example, straight debt, convertible debt, preferred stock, convertible preferred stock, trust preferred, and convertible trust preferred.

Applicants have developed a mandatory unit structure that ensures that a remarketing will, eventually, likely be successful (thereby ensuring that interest on the note portion is deductible) and which also includes an ability to substantially control or cap the reset rate at which the remarketing will occur (thereby allowing Tier 1 capital treatment). While further details of some embodiments will be provided below, in general, embodiments involve units that are issued having a number of scheduled remarketings (some of which are capped; some of which are uncapped). In some embodiments, units may further include one or more windows during which the issuer of the unit can attempt opportunistic remarketings (capped or uncapped). In general, Applicants believe that this results in a unit structure that ensures that the remarketing will likely be successful while providing substantial control over the reset rate.

Figure 1:
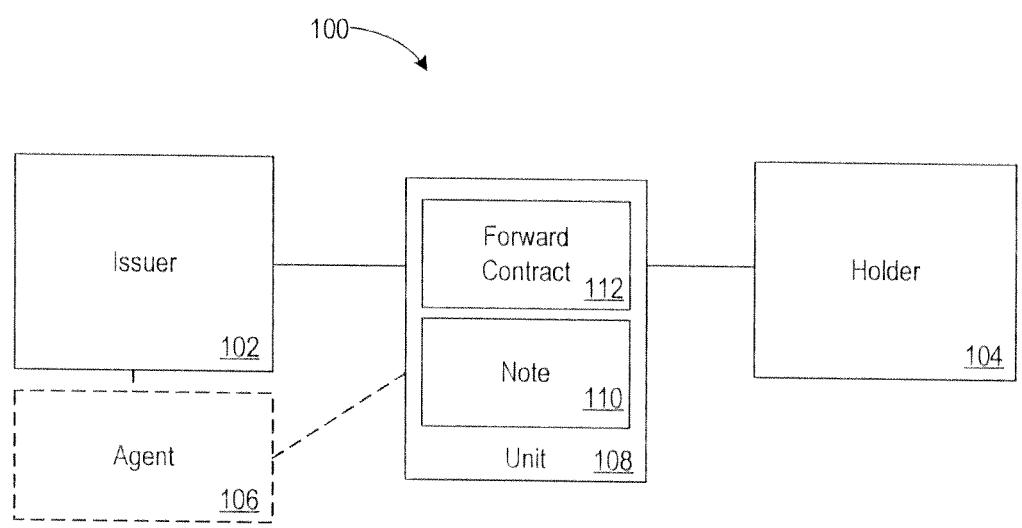
FIG. 1 is a block diagram of a transaction consistent with some embodiments.

Features of embodiments will be described by first referring to FIG. 1, where block diagram depicts a transaction 100 consistent with some embodiments. As shown, transaction 100 may involve several entities or individuals: an issuer 102, a Holder 104 and (in some embodiments) one or more agents 106. In particular, transaction 100 involves the issuance of a unit 108 to holder 104, where unit 108 consists of a forward contract 112 and a note 110.

Pursuant to embodiments of the present invention, issuer 102 is a "Tier 1" issuer (that is, an issuer subject to capital adequacy rules or regulations). For example, issuer 102 may desire to raise capital through the issuance of a unit. In some embodiments, issuer 102 issues a unit directly to third parties. In some embodiments, a third party intermediary (such as one or more agents 106) may participate in the issuance of unit 108 to third parties. For example, agents 106 may be one or more underwriters, support companies, trustees, or the like (some of which will be discussed further below, some of which will be apparent to those skilled in the art).

In some embodiments, holder 104 may be, for example, an individual or entity desiring to invest in debt and equity securities associated with issuer 102. For example, in some embodiments, holder 104 may be an institutional investor such as a qualified institutional buyer.

Pursuant to some embodiments, unit 108 includes a forward contract 112 that includes terms obligating holder 104 to pay an amount (the "settlement price") to issuer 102 at a particular date (the "settlement date") in exchange for a number of shares of stock of issuer 102. In particular, holder 104 is to receive art amount of stock of issuer 102 that initially (e.g., as of the "issue date" of the unit) has a value equal to the settlement price. In some embodiments, the stock is common stock of issuer 102. In some embodiments, issuer 102 is required to pay a contract fee to holder 104 in exchange for the holder's obligation to pay the settlement price at the settlement date. For example, the contract fee may be calculated as a percentage of the settlement amount. The fee may be paid quarterly or in other installments. In some embodiments, the settlement date is a date three (3) or four (4) years after the issue date of the unit (and, as will be described further below, is selected to have a shorter term than the term of note 110).

Unit 108 includes a note 110 that is pledged to secure the holder's obligations to pay the settlement price under forward contract 112. In some embodiments (e.g., as discussed in our co-pending application Ser. No. 10/707,491), note 110 is a convertible note (and, in some embodiments, is a contingent convertible note). In some embodiments, note 110 is another form of debt instrument provided to secure the obligations under the forward contract 112. As discussed above, other types of instruments may also be used to secure the holder's obligations under forward contract 112.

Pursuant to some embodiments, note 110 specifies several types of remarketings and several remarketing dates which are selected and structured as described below in conjunction with FIG. 3. In general, pursuant to some embodiments, note 110 includes terms specifying several scheduled remarketings which are "capped" (that is, the initial remarketings may be structured such that they have a reset rate which is capped). If the first of the scheduled capped remarketings is not successful, a second (and then a third, for example) are attempted within a relatively short period of time (e.g., each capped remarketing may be attempted several months after the last failed capped remarketing). A scheduled uncapped remarketing is scheduled and is performed if each of the capped remarketings fails.

In some embodiments, the issuer may also be provided aright to attempt an "opportunistic" remarketing during some period if each of the scheduled capped remarketings fail. For example, the opportunistic remarketing period may be scheduled to occur prior to the scheduled uncapped remarketing. In embodiments utilizing opportunistic remarketings, if the opportunistic remarketing fails (or is not attempted by the issuer), the scheduled uncapped remarketing is performed.

In this manner, (whether or not the optional "opportunistic" remarketing is used) it is highly likely that a remarketing will be successful. It is also likely that the remarketing will be successful in one of the capped remarketings, thereby ensuring that the reset rate is controlled. Other reset and remarketing provisions and techniques may also be used in conjunction with embodiments disclosed herein.

Figure 2:
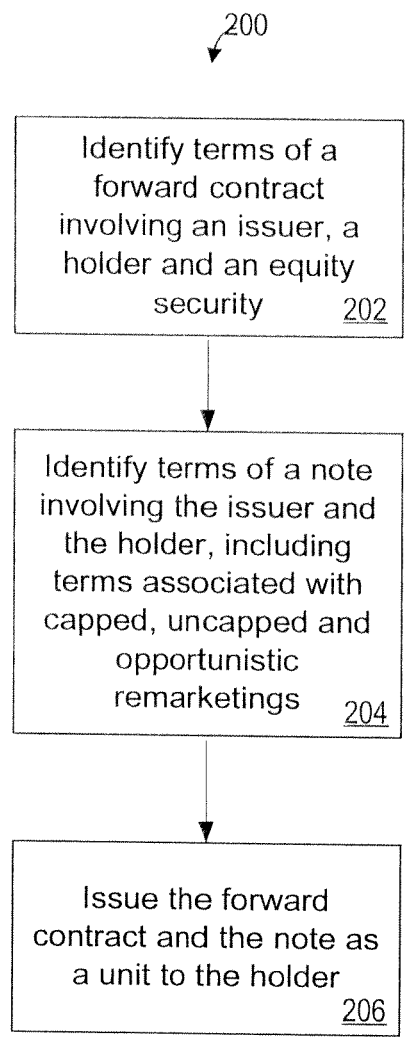
FIG. 2 is a flow diagram illustrating an exemplary process for issuing a unit pursuant to some embodiments.

Referring now to FIG. 2, a process 200 is shown for issuing a unit to a holder pursuant to embodiments of the present invention. Each of the process blocks of the flow diagram of FIG. 2 (and other processes discussed herein) may be performed in any reasonable order and need not be performed in the sequence shown. In some embodiments, some or all of the processing of transaction process 200 may be performed using one or more computing devices configured to perform the processing described herein. For example, as will be described in further detail below, some or all of the processing may be performed using a unit administrator device 400 such as the device depicted in FIG. 4.

Pursuant to some embodiments, a process 200 for issuing a unit to a holder includes identifying (at 202) terms of a forward contract involving an issuer, a holder and an equity security. For example, terms of the forward contract may include terms specifying a settlement date, a settlement price, and a share delivery formula for calculating a share delivery of issuer stock to the holder at the settlement date.

Processing continues at 204 where terms of a note involving the issuer and the holder are identified. A number of different types of notes may be issued as a unit with the forward contract, each of which may be selected to provide desired financial benefits. In general, the terms of the note will include terms identifying a maturity of the note, an interest rate associated with the note, acceptable substitute collateral that may be pledged by the holder to separate the contract from the note, and other terms known to those skilled in the art. Pursuant to embodiments of the present invention, note also includes terms specifying several remarketing events, including one or more capped remarketings, an opportunistic remarketing period, and an uncapped remarketing.

The initial remarketing is a capped remarketing; that is, the initial remarketing is specified as having a rate that cannot exceed a specified rate. If any of the remarketings are successful, the proceeds are used to immediately settle forward contract 112. For example, in some embodiments, the initial remarketing is capped at a readily ascertainable market rate associated with an instrument having a comparable maturity as the note. In some embodiments, the remarketing must generate sufficient proceeds to settle forward contract 112 and also to compensate a remarketing agent. For example, note 110 may specify that the remarketing must reset (if at all) so that note 110 can be remarketed for at least 100.5% of the settlement price using U.S. Treasury securities that will mature at the settlement price (where the additional 0.5% is provided to compensate the remarketing agent). Those skilled in the art will appreciate that other fee structures may also be provided (e.g., a fee of 0.25% may be provided instead of 0.50%, etc.).

In some embodiments, the remarketings may be scheduled to occur such that the proceeds may be used to purchase Treasury securities (e.g., the proceeds may not be used to immediately settle forward contract 112, but instead may be used to purchase Treasury securities or the like prior to settling).

In some embodiments, a set of additional capped remarketings are scheduled. For example, in one embodiment, a set of two (2) or three (3) capped remarketings are scheduled to occur if the initial remarketing fails. These additional capped remarketings may be scheduled to occur in a particular sequence. For example, if the forward contract is a four (4) year contract, and the initial remarketing was scheduled to occur around the time of the settlement of the forward contract, the additional capped remarketings may be scheduled to occur before the settlement date. As a specific example, three (3) additional capped remarketings maybe scheduled to occur at year 3.25, year 3.5, and year 3.75. For each of these scheduled additional capped remarketings, the rate may be reset so long as it is below a set cap. Again, the cap may be specified based on comparable instruments.

In some embodiments, note 110 may optionally include terms specifying a period in which issuer 104 may attempt (at its option) one or more opportunistic remarketings (which may be capped or uncapped as desired by the issuer). In some embodiments, this opportunistic remarketing period is set to occur during a period beginning after failure of the initial capped remarketing, and extending until a final uncapped remarketing is scheduled. This final uncapped remarketing may be scheduled to occur after the last of the scheduled capped remarketings. In this manner, if each of the scheduled capped remarketings fails, the issuer will have the ability to attempt one or more opportunistic remarketings prior to performance of a scheduled uncapped remarketing.

Issuance of unit 108 is completed at 206 where the forward contract 112 and the note 110 are issued as a unit to the holder 104. Pursuant to embodiments of the present invention, because it is likely that a remarketing of the note will succeed, and because it is likely that the remarketing will succeed with a capped reset rate, it is expected that the unit may be issued by regulated entities as Tier 1 capital.

Figure 3:
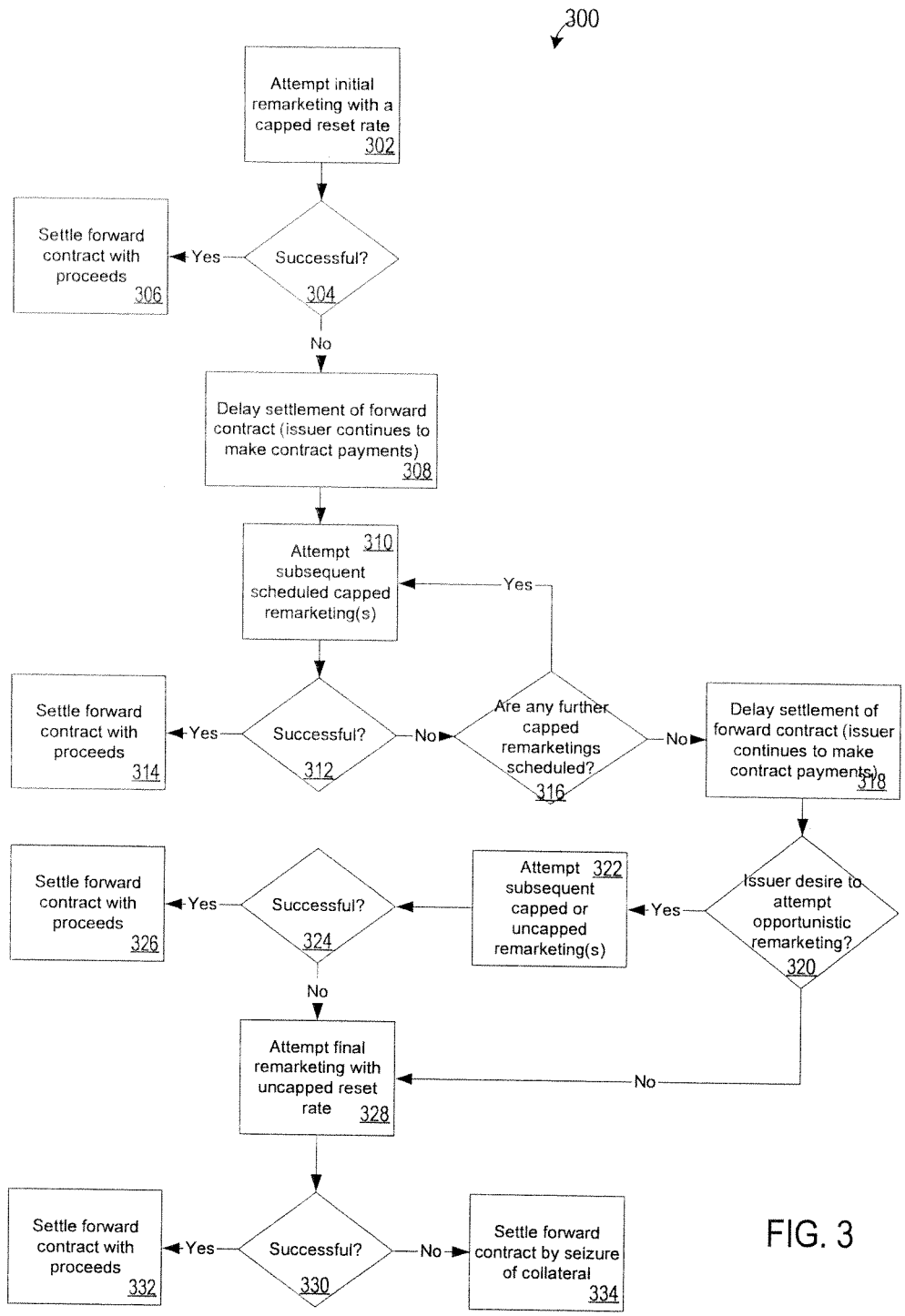
FIG. 3 is a block diagram of a unit administrator device pursuant to some embodiments.

Reference is now made to FIG. 3, where a process 300 is shown for remarketing a unit issued pursuant to embodiments of the present invention. Some, or all, of the process steps of process 300 may be performed to perform a remarketing of a unit issued pursuant to embodiments of the present invention. The timing of the performance of process 300 depends on the terms and conditions of each unit.

For example, to illustrate features of embodiments, process 300 will be described by referring to a particular unit which issued having the following terms (among others). The unit was issued on Feb. 15, 2001 and includes a forward contract having a settlement date of Feb. 15, 2004 and a settlement amount of $1,000. The forward contract is secured by a note, and the issuer is obligated to make quarterly contract payments on the forward contract. An initial remarketing is scheduled to occur prior to the settlement date. For example, an initial remarketing is scheduled to occur three (3) months prior to the settlement date. That is, on or about Nov. 15, 2003 a remarketing is scheduled to be performed to reset the interest rate of the note to a rate that will allow the note to be resold or remarketed for an amount at least equal to the settlement amount of the forward contract. Further, in the illustrative example, the note is a 30-year non-convertible trust preferred note.

Based on (and referring to) this illustrative example, process 300 will now be described. Process 300 begins at 302 where an initial remarketing with a capped reset rate is attempted. In the example, the attempted initial remarketing with a capped reset rate occurs on or about Nov. 15, 2003. The reset rate of the attempted initial remarketing is capped at the issuer 30-year non-convertible trust preferred rate as of the date of issuance (in the example, as of Feb. 15, 2001). If the attempted initial remarketing is successful, the process continues at 306 where the forward contract is settled with the proceeds from the remarketing. Any additional funds from the remarketing are disbursed to the holder (after any remarketing fees are paid).

If, however, the initial capped remarketing is unsuccessful, the process continues at 308 where settlement of the forward contract is delayed. If any contract payments are scheduled, the issuer will be required to continue to make these contract payments during the period of the delay.

Processing continues at 310 where one or more subsequent scheduled capped remarketings are attempted. As a specific example, a unit may be issued which includes three scheduled capped remarketings, where the remarketings are scheduled to occur in years 3.25, 3.5, and 3.75. For each of these scheduled capped remarketings, the reset rate may be capped at a rate set at issuance of the unit. Continuing the illustrative example, the reset rate may be capped at the issuer 30-year non-convertible trust preferred rate as of Feb. 15, 2001.

If a subsequent scheduled capped remarketing is successful, processing continues to 314 where the forward contract is settled with the proceeds from the remarketing. Again, any additional funds from the remarketing are disbursed to the holder (after payment of any remarketing fees).

If a subsequent scheduled capped remarketing is unsuccessful, processing continues to 316 where a determination is made whether any further capped remarketings are scheduled. In the illustrative example, if the scheduled capped remarketing at year 3.25 is unsuccessful, the additional scheduled capped remarketing at year 3.5 is attempted, and so on. During the period between scheduled capped remarketings, settlement of the forward contract is delayed and any contract payments owed are paid by the issuer.

If no additional capped remarketings are scheduled, processing continues to 318 where settlement of the forward contract is again delayed (and the issuer, if required, continues to make any scheduled contract payments). During this period, processing may continue to 320 where the issuer can elect to attempt an opportunistic remarketing. In some embodiments, the issuer may be permitted to attempt one or more opportunistic remarketings any time after the initial scheduled capped remarketing (e.g., in some embodiments, the opportunistic remarketings may be attempted any time after year three (3) or after the originally-scheduled settlement date). In some embodiments, these opportunistic remarketings may be capped or uncapped (at the issuer's option).

If any attempted opportunistic remarketing is successful, processing continues at 326 where the forward contract is settled using proceeds from the successful remarketing. Again, any additional funds from the remarketing are disbursed to the holder (after any remarketing fees are paid).

If any attempted opportunistic remarketing is unsuccessful, processing continues at 328 where a final remarketing with an uncapped reset rate is attempted. This final remarketing, in some embodiments, is scheduled to occur after the last of the scheduled subsequent capped remarketings. In the illustrative example, the final remarketing with an uncapped reset rate is scheduled to occur shortly after the last capped remarketing scheduled at year 3.75 (e.g., the final remarketing with an uncapped reset rate may be attempted at year 4).

If the final remarketing with an uncapped reset rate is successful, processing continues at 332 where the forward contract is settled with the proceeds from the remarketing. Again, any additional funds from the remarketing are disbursed to the holder (after any remarketing fees are paid). If, however, the final remarketing with an uncapped reset rate is unsuccessful, processing continues at 334 where the forward contract is settled by seizure of collateral (e.g., by seizure of the note component of the unit).

In this manner, embodiments provide a remarketing period during which a number of different attempts at remarketing a note portion of a mandatory unit may be performed. More particularly, embodiments initially attempt capped remarketings. If the capped remarketings fail, an uncapped remarketing is attempted.

Pursuant to some embodiment, some or all of the processes of FIGS. 2 and 3 may be performed using one or more computing devices. Similarly, any of the participants (such as the issuer, the holder, or the agent) may utilize one or more computing devices to evaluate, price, administer, or manage units issued pursuant to embodiments described herein.

Figure 4:
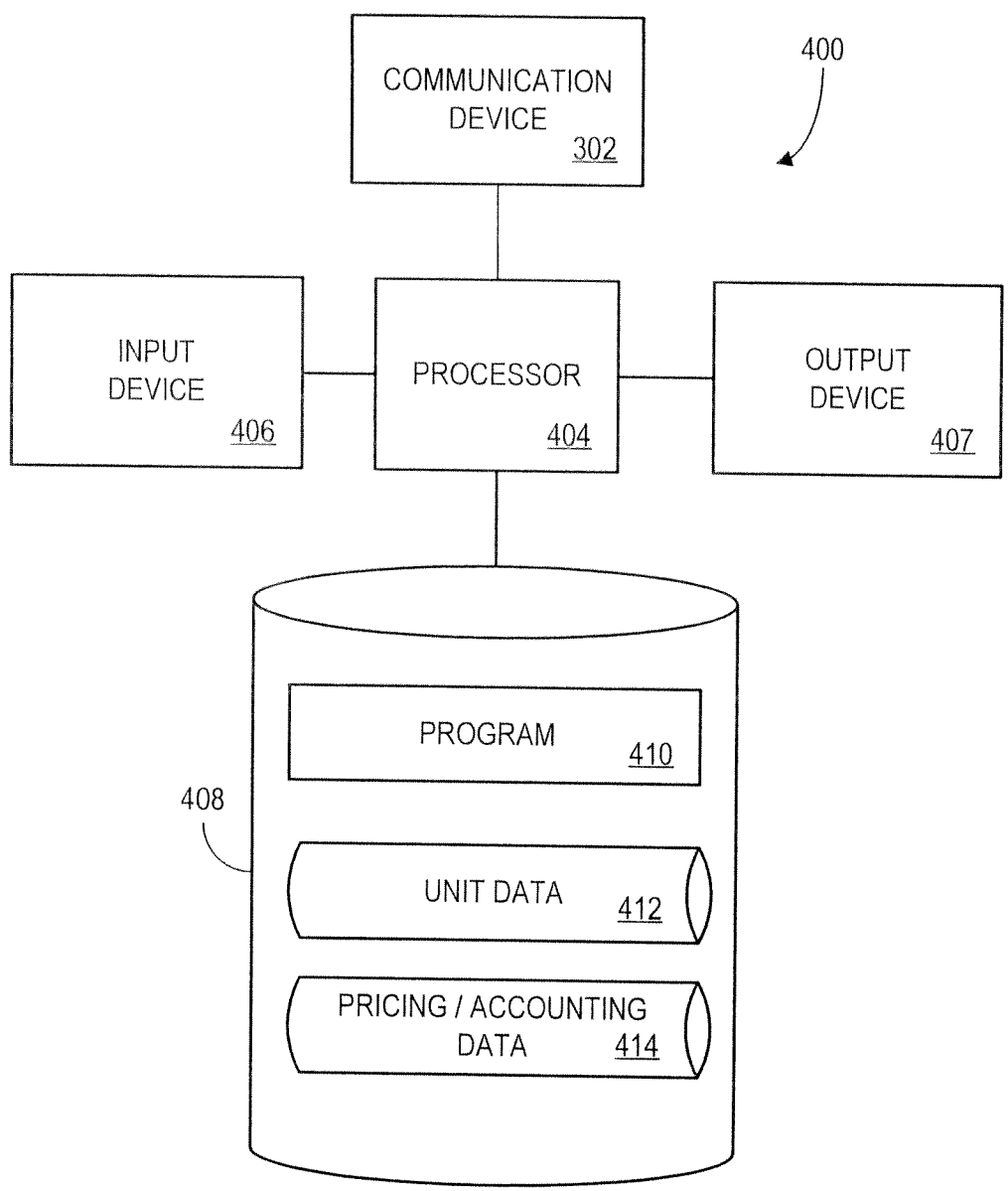
FIG. 4 is a block diagram illustrating a computing device pursuant to some embodiments.

For example, referring now to FIG. 4, a computing device such as device 400 may be utilized. In some embodiments, device 400 is operated by one or more unit administrators acting to assist in, or direct the issuance of units pursuant to embodiments disclosed herein. For example, in some embodiments, device 400 is operated by, or on behalf of, an issuer to price and identify terms associated with the issuance of units. As another example, in some embodiments, device 400 may be operated by, or on behalf of, a remarketing agent to assist in the performance of one or more remarketings pursuant to embodiments of the present invention. As other examples, device 400 may be operated by, or on behalf of, a holder, an agent, or other participant in a transaction involving units as described herein.

As depicted, device 400 includes a computer processor 404 operatively coupled to a communication device 402, a storage device 408, an input device 406 and an output device 407. Communication device 402 may be used to facilitate communication with, for example, other devices and other participants (such as, for example, devices operated by holders, issuers, agents, market data providers, etc.)

Input device 406 may comprise, for example, one or more devices used to input data and information, such as, for example: a keyboard, a keypad, a mouse or other pointing device, a microphone, knob or a switch, an infra-red (IR) port, etc.

Output device 407 may comprise, for example, one or more devices used to output data and information, such as, for example: an IR port, a docking station, a display, a speaker, and/or a printer, etc.

Storage device 408 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 408 stores one or more programs 410 or rule sets for controlling processor 404. Processor 408 performs instructions of program 410, and thereby operates in accordance with aspects of the present invention. In some embodiments, program 410 includes pricing rules used to evaluate or select terms associated with units issued pursuant to embodiments described herein. In some embodiments, program 410 includes rules used to identify the occurrence of events associated with units issued pursuant to the present invention (and to perform administration tasks relating to the occurrence of the events). In some embodiments, program 410 may be configured as a neural-network or other type of program using techniques known to those skilled in the art to achieve the functionality described herein.

Storage device 408 also stores one or more databases, including, for example, unit data 412, pricing and accounting data 414, etc. This information may be used, for example, to issue and/or administer units pursuant to embodiments disclosed herein. For example, unit data 412 may include information associated with the terms and conditions of units that have been issued and may be used to monitor and administer the units. Other data, programs, and rules may also be used in conjunction with embodiments disclosed herein.

Although the present invention has been described with respect to a preferred embodiment thereof, those skilled in the art will note that various substitutions may be made to those embodiments described herein without departing from the spirit and scope of the present invention.

What is claimed is:

1. A processor-implemented method for remarketing a unit comprising:

receiving, by a processor, data related to a proposed unit remarketing transaction including a note portion and a forward contract portion;

initiating by the processor a first capped remarketing of the note portion of the proposed unit prior to a settlement date of the forward contract portion of the proposed unit;

attempting by the processor a subsequent second capped remarketing of the proposed unit when the first capped remarketing is unsuccessful;

initiating by the processor a final remarketing of the note portion of the proposed unit, when the subsequent second capped remarketing is unsuccessful; and issuing by the processor the note portion and the forward contract portion as the unit based on successful remarketing terms.

2. The method of claim 1, wherein the proposed unit is a mandatory unit and includes scheduling data.

3. The method of claim 2, further comprising:
extracting a schedule for remarketing the proposed unit from the received data;
determining a structure type of the proposed unit from the received data wherein the structure type is a combination of capped or uncapped remarketing information.

4. The method of claim 3, further comprising:
performing an opportunistic remarketing, wherein the opportunistic remarketing is prior to a final uncapped remarketing and performed according to the extracted remarketing schedule set by an issuer of the proposed unit.

5. The method of claim 4, further comprising:
wherein the first remarketing of the proposed unit is subject to a reset rate cap.

6. The method of claim 5, further comprising:
wherein the final remarketing of the note portion of the proposed unit is attempted prior to the settlement date.

7. The method of claim 6, wherein the opportunistic remarketing is at least one of a capped and an uncapped remarketing.

8. The method of claim 7, further comprising:
settling, when the remarketing is successful, the forward contract portion of the proposed unit with proceeds from a successful remarketing.

9. The method of claim 8, further comprising:
wherein the final remarketing of the proposed unit is not subject to a reset rate cap.

10. The method of claim 9, wherein a remarketing is successful when the note portion can be resold for an amount greater than a settlement price associated with the forward contract portion.

11. The method of claim 10, wherein a remarketing is successful when the note portion can be resold for an amount greater than a settlement price associated with said forward contract plus a remarketing fee.

12. The method of claim 11, further comprising:
determining when each of the remarketing of the proposed unit is unsuccessful; and
settling the forward contract portion of the proposed unit with a seizure of collateral of a holder of the forward contract portion when each of the remarketing of the proposed unit is unsuccessful.

13. The method of claim 12, wherein both the subsequent second capped remarketing and the final remarketing of the proposed unit are scheduled to occur prior to the settlement date and after the first remarketing of the proposed unit.

14. The method of claim 13, wherein when the subsequent second capped remarketing is unsuccessful, a third and a fourth capped remarketing are attempted prior to the final remarketing.

15. A processor-readable non-transitory medium storing a plurality of processing instructions, comprising issuable instructions by a processor to:
receive data related to a proposed unit remarketing transaction including a note portion and a forward contract portion;
initiate a first capped remarketing of the note portion of the proposed unit prior to a settlement date of the forward contract portion of the proposed unit;
attempt a subsequent second capped remarketing of the proposed unit when the first capped remarketing is unsuccessful;
initiate a final remarketing of the note portion of the proposed unit, when the subsequent second capped remarketing is unsuccessful; and
issue the note portion and the forward contract portion as a unit based on successful remarketing terms.

16. An apparatus for remarketing a mandatory unit comprising:
a memory;
a processor disposed in communication with said memory, and configured to issue a plurality of processing instructions stored in the memory, wherein the processor issues instructions to:
receive data related to a proposed unit remarketing transaction including a note portion and a forward contract portion;
initiate a first capped remarketing of the note portion of the proposed unit prior to a settlement date of the forward contract portion of the proposed unit;
attempt a subsequent second capped remarketing of the proposed unit when the first capped remarketing is unsuccessful;
initiate a final remarketing of the note portion of the proposed unit, when the subsequent second capped remarketing is unsuccessful; and
issue the note portion and the forward contract portion as a unit based on successful remarketing terms.

* * * * *